United States Patent [19]

Pasquali

[11] Patent Number: 4,636,036

[45] Date of Patent: Jan. 13, 1987

[54] MULTI-COLOR TRAFFIC SIGNAL

[75] Inventor: Giancarlo Pasquali, Bologna, Italy

[73] Assignee: Sasib S.p.A., Bologna, Italy

[21] Appl. No.: 303,140

[22] Filed: Sep. 17, 1981

[51] Int. Cl.⁴ .................... G02B 27/14; B61L 15/00; B60Q 1/26

[52] U.S. Cl. ...................................... 350/172; 340/47; 116/49

[58] Field of Search ............... 350/172, 361, 174; 340/50, 47, 48, 66; 116/49, 202

[56] References Cited

U.S. PATENT DOCUMENTS

| | | | |
|---|---|---|---|
| 1,498,184 | 5/1921 | McCarthy | 340/50 |
| 3,601,470 | 8/1971 | Juhlin | 350/172 |
| 4,046,476 | 9/1977 | Charamella et al. | 350/172 |

Primary Examiner—John K. Corbin
Assistant Examiner—P. M. Dzierzynski
Attorney, Agent, or Firm—Spencer & Frank

[57] ABSTRACT

The multi-color traffic signal for railways comprises for each one of the three colors a projector unit consisting of a lamp, an optical unit and a chromatic filter. The projector units are connected to an irradiating output optics by means of an optical channel system consisting of a main rectilinear channel presenting at one end the irradiating output optics and at the other end a first projector unit in axial alignment with the main channel. A second and third projector units are housed in transverse channels at 90° with respect to the main channel and open thereinto. A first dichroic mirror is arranged in the main channel with an angle of 45° in correspondence with the outlet of the transverse channel of the second projector unit and a second dichroic mirror is arranged in the main channel with an angle of 45° in correspondence with the outlet of the transverse channel of the third projector unit.

3 Claims, 3 Drawing Figures

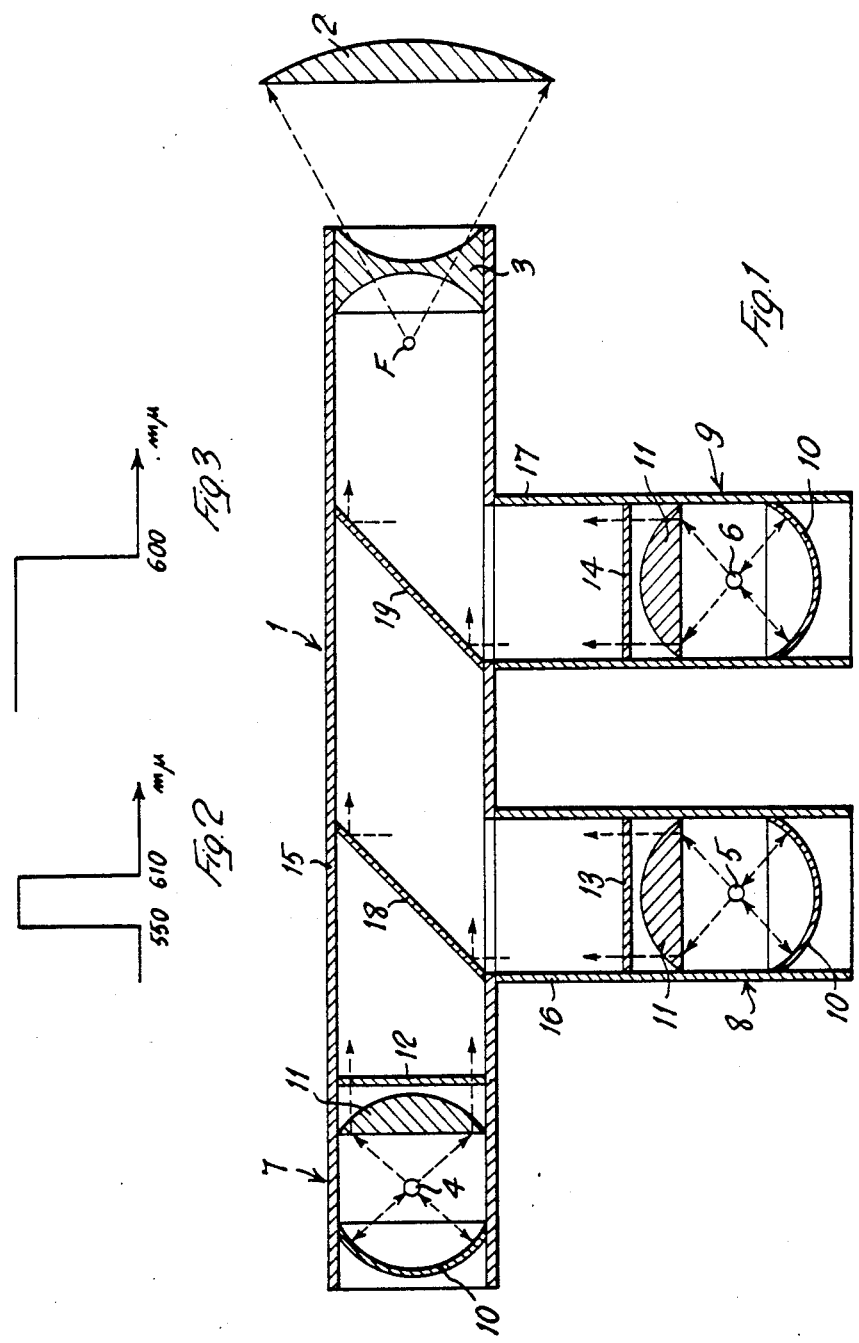

MULTI-COLOR TRAFFIC SIGNAL

BACKGROUND AND SUMMARY OF THE INVENTION

The invention relates to optical railway signals and in particular to those of the type called "searchlight signals" where a disk mask has at the center a circular window from which one or more sources of light, associated to a suitable optical unit, project, selectively on the basis of a control, one of a plurality of colored lights, usually red, green and yellow.

In the oldest types of railway light signals, of the above specified type, there is provided a single light source or lamp with a respective optical unit which guides and projects a light beam through the window. Suitable chromatic filters are interposed between the lamp and the optical unit, and the colors are changed by shifting the filters by mechanical means, electro-magnetically operated.

With the purpose of avoiding movable parts (which are more prone to failure) static signals have been introduced having a number of light sources corresponding to that of the signal colors desired. In this case the device comprises, for each light source, an optical projector, which collects and projects a light beam emitted by the corresponding source, and this beam is taken in a respective light conducting system, or optical channel or guide, which directs it to the signal exit window. The optical unit associated to each light source comprises also the respective chromatic filter, which is obviously fixed. The light conducting system, or optical channel, consists of distinct bundles of optical fibers which, starting from each respective light source, are brought to converge into a single bundle, the terminal of which is operatively aligned with the signal window. A traffic signal of this type is described, for example, in my pending U.S. application Ser. No. 133,104 filed on Mar. 24, 1980 (now allowed).

Although the traffic signals of the type above disclosed have given satisfactory results, they present an inconvenience which is due to the fact that it is not possible to utilize the light conducting system, in correspondence of its terminal at the signal window, at the maximum of its capacity.

In fact, in the case of a light conducting system consisting of bundles of optical fibers, it appears evident that the single common bundle terminating in correspondence of the signal window consists of the union of three separate bundles (if three colors are required), and that therefore only a fraction of this common bundle (in the specific case ⅓) is actually used for the conveyance of the colored light.

According to the present invention, there is proposed a traffic signal which fully utilizes the light conducting system, or optical channel, also in its terminal portion associated to the signal window, thus obtaining an intensity of light for the irradiated colored light beams, which is decidedly superior than that obtained by the known traffic signals of the static type, as above disclosed.

The multi-color traffic signal according to the invention is characterized by the fundamental feature that the light conducting system, or optical channel system, comprises at least one dichroic mirror which is spectrophotometrically adjusted with respect to the bands of wave length of the colored lights produced by the individual projector units, each dichroic mirror being arranged, at the interior of the optical channel system, in such a manner as to reflect towards the irradiating output optics the colored light beam produced by a projector unit associated thereto, while it permits the passage towards the said irradiating output unit of the colored light beams produced by the remaining projector units.

More particularly, the traffic signal for railways with the possibility of selectively projecting one of three colored lights (green, red and yellow) comprises for each color a projector unit consisting of a lamp, an optical unit and a chromatic filter. The projector units are connected to an irradiating output optics by means of an optical channel system consisting of a main rectilinear channel presenting at one end the irradiating output optics and at the other end a first projector unit in axial alignment with the main channel. A second and third projector units are housed in transverse channels at 90° with respect to the main channel and open thereinto. A first dichroic mirror is arranged in the main channel with an angle of 45° in correspondence with the outlet of the transverse channel of the second projector unit and a second dichroic mirror is arranged in the main channel with an angle of 45° in correspondence with the outlet of the transverse channel of the third projector unit.

The above and other features of the invention and the resulting advantages, will be understood from the following detailed description of a preferred embodiment of same, given as non restrictive example, with reference to the attached drawing.

BRIEF DESCRIPTION OF THE DRAWINGS

FIG. 1 is a diagrammatic view showing in longitudinal section the multi-color traffic signal according to the invention.

FIGS. 2 and 3 are spectrophotometric diagrams relating to the dichroic mirrors employed in the multi-color traffic signal according to FIG. 1.

DESCRIPTION OF THE PREFERRED EMBODIMENT

With reference to the Figures, the static multi-color traffic signal 1 presents an irradiating output optics comprising an aspherical lens 2 with focus F, and a biconcave lens 3, with the same focus F, in such a manner that the said biconcave lens 3 receives the beam of parallel rays of light from the optical channel system of the signal 1 and opens said beam against lens 2, which eventually forms again the output beam of parallel rays.

The optical channel system of the traffic signal 1 originates from the filaments of three lamps 4, 5 and 6 of three respective color projector units, i.e. projector unit 7 for the yellow color, 8 for the green and 9 for the red.

For each one of the said color projector units, there is provided an optical unit in which the filament of the respective lamp is arranged, in a known manner, in the focus of a spherical mirror 10, which reproduces the image of the filament next to the filament itself. Both the filament and its image reproduced by the mirror 10 are positioned in the focus of a plano-spherical lens 11, at the output of which there is obtained a beam of white light with parallel rays, which assumes, respectively for the projector units of the three lamps 4, 5, 6, the colors yellow, green and red, by passing through the color filters 12, 13 and 14.

Accordingly, each projector unit comprises a light source (lamps 4, 5, 6), an optical unit (mirrors 10, plano-spherical lenses 11) and a chromatic filter (color filters 12, 13, 14).

According to the requirements of the Italian State Railways, the color filter for the prescribed yellow radiation permits the passage of the optical radiation comprised in the range of wave length from 592.8 to 594.7 millimicrons; the filter for the green permits the passage of radiations in a range from 494.2 to 495.5 millimicrons; and the filter for the red permits the passage of radiations in a range from 632.5 to 636.5 millimicrons.

As it appears from FIG. 1, the projector unit 7 for the yellow color is arranged co-axially with the main channel 15 of the channel system, at the end opposite to the end presenting the biconcave lens 3, while the projector units 8 for the green color and 9 for the red color are arranged in side channels 16, respectively 17, which open transversally into the main channel 15, at positions suitably spaced between each other, in the portion between the projector unit 7 for the yellow color and the biconcave lens 3.

According to the invention, a dichroic mirror 18 is arranged in the main optical channel 15, inclined of 45° facing the outlet of channel 16 of the projector unit 8 for the green light, so as to reflect this light forward, towards the biconcave lens 3; and an analogous dichroic mirror 19 is similarly arranged in the main channel 15, inclined of 45° and facing the outlet of channel 17 of the projector unit 9 for the red light.

The dichroic mirror 18 is constructed in such a manner that its spectrophotometric curve is the one diagrammatically shown in FIG. 2. In accordance with this curve, the dichroic mirror 18 permits the passage of the band of wave lengths comprised between 550 and 610 millimicrons, of the light incident thereonto at an angle of 45°. This mirror 18 therefore permits the passage of the yellow passed through filter 12, comprised between the wave lengths from 592.8 to 594.7 millimicrons, while it reflects the lights of all other wave lengths and consequently also the green passed through filter 13, the band of which is comprised between 494.2 and 495.5 of wave length.

The dichroic mirror 19, instead, presents a spectrophotometric curve as diagrammatically indicated in FIG. 3 which permits the passage, of the total light incident thereonto, only of the light presenting a wave length less than 600 millimicrons, and which therefore comprises the above mentioned bands of the green and yellow colors while it reflects the light having wave length greater than 600 millimicrons, and consequently also the red light, passed through filter 14, which has a band of wave lengths comprised between 632.5 and 636.5 millimicrons.

The parallel rays of the beam of colored light (red, green or yellow) incident against the biconcave lens 3 (from left to right in FIG. 1) are caused to diverge by said lens, so that the virtual image of the filaments of lamps 4, 5 or 6 falls in the focus F of the lens itself. The focus F coincides with the focus of the aspherical lens 2 of the signal and it supplies, at the output, optical performances which are equal to those supplied by the traffic signals of the type presenting a single central projector unit and electro-mecanically operated, shiftable color filters.

It is evident in fact, that the optical channel is not subdivided in a plurality of channel portions for the colored light generators, as it usually happens in the known type static traffic signals (for example employing fiber optics) but it is fully utilized for each color at the maximum of its practical capacity of light flow, for each one of the color beams generated by the projector units, which can be therefore constructed of suitable power, equal to the power of the single projector unit of a conventional multi-color traffic signal.

The invention is not limited to the just described embodiments, but is subject to variations in dependence with particular requirement of practical cases and national railways prescriptions, the whole without departing from the inventive idea as above described and claimed hereafter.

I claim:

1. Multi-color traffic signal in particular for railway line signalling installations, of the type presenting for each color a projector unit (7, 8, 9) comprising a light source (4, 5, 6), an optical unit (10, 11) and a chromatic filter (12, 13, 14), the projector units being connected to an irradiating output optics (2, 3) by means of an optical channel system (15, 16, 17), and the projector units being controlled so that only one unit produces a light beam at any given time, characterized by the fact that the said optical channel system comprises a main rectilinear channel (15) presenting at one end the irradiating output optics (2, 3) and at the other end a first projector unit (7) in axial alignment with said main channel (15), second and third projector units (8, 9) being housed in transverse channels (16, 17) arranged at 90° with respect to the said main channel (15) and opening thereinto, a first dichroic mirror (18) being arranged in the main channel with an angle of 45°, in correspondence with the outlet of the transverse channel of the second projector unit, and a second dichroic mirror (19) being arranged in the main channel with an angle of 45° in correspondence with the outlet of the transverse channel of the third projector unit, each said dichroic mirror (18, 19) being spectrophotometrically adjusted with respect to the bands of wave length of the colored lights produced by the said projector units (7, 8, 9), each said dichroic mirror (18, 19) being arranged, at the interior of the optical channel system, in such a manner as to reflect towards the irradiating output optics (2, 3) the colored light beam produced by a projector unit (8, 9) associated thereto, while it permits the passage towards the said irradiating output unit (2, 3) of the colored light beams produced by the remaining projector units (7, 8), and each said projector unit producing a light beam of a respectively different color.

2. Multi-color signal according to claim 1, wherein said chromatic filter of said first projector unit is a chromatic filter for the yellow color in the wave length band from 592.8 to 594.7 millimicrons, said chromatic filter of said second projector unit is a chromatic filter for the green color in the wave length band from 494.2 to 495.5 millimicrons, said chromatic filter of said third projector unit is a chromatic filter for the red color in the wave length band from 632.5 to 636.5 millimicrons, and said first dichroic mirror (18) presents a spectrophotometric curve such that, of any light beam incident thereonto with an angle of 45°, it permits the passage of the light in the wave length band comprised between 550 and 610 millimicrons, and it reflects all other wave lengths, while said second dichroic mirror presents a spectrophotometric curve such that, of any light beam incident thereonto with an angle of 45°, it permits the passage of the light having a wave length smaller than 600 millimicrons, and it reflects the light having a wave length greater than 600 millimicrons, whereby said first dichroic mirror (18) permits the passage of the yellow color and it reflects the green color, while said second dichroic mirror (19) permits the passage of the yellow and green colors, and it reflects the red color.

3. A multi-color signal according to claim 1, in which the said irradiating output optics comprises an aspherical lens (2) associated to a biconcave lens (3) arranged at the outlet of the optical channel system (15, 16, 17) the said aspherical lens and the said biconcave lens having a common focus (2).

* * * * *